US012355487B2

(12) United States Patent
Sage et al.

(10) Patent No.: US 12,355,487 B2
(45) Date of Patent: Jul. 8, 2025

(54) SYSTEM FOR MONITORING A NETWORK FORMED BY A PLURALITY OF DEVICES

(71) Applicant: NEXANS, Courbevoie (FR)

(72) Inventors: Jean-Jacques Sage, Suze-la-Rousse (FR); Mathieu Brigot, Yerres (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/949,875

(22) Filed: Sep. 21, 2022

(65) Prior Publication Data

US 2023/0113892 A1 Apr. 13, 2023

(51) Int. Cl.
*H04B 10/075* (2013.01)
(52) U.S. Cl.
CPC ................. *H04B 10/075* (2013.01)
(58) Field of Classification Search
CPC .......................................... H04B 10/07–0799
See application file for complete search history.

(56) References Cited

U.S. PATENT DOCUMENTS

| 2002/0101630 A1* | 8/2002 | Nikolich | H04B 10/077 398/79 |
| 2010/0198559 A1* | 8/2010 | Warren | H04L 43/00 702/188 |
| 2013/0148960 A1* | 6/2013 | Vojtech | H04Q 11/0005 398/25 |
| 2022/0216916 A1* | 7/2022 | Compann | H04B 10/0731 |

OTHER PUBLICATIONS

J. Xiao and W. Ying, "Monitoring system of regional environmental pollution index based on telecommunication network," 2011 International Conference on Electrical and Control Engineering, Yichang, China, 2011, pp. 254-256, doi: 10.1109/ICECENG.2011.6057335. (Year: 2011).*
Nexans: "Controle d'acces et Supervision", Jul. 31, 2021 (Jul. 31, 2021).
International Search Report dated Jun. 14, 2022.

* cited by examiner

*Primary Examiner* — Nathan M Cors
(74) *Attorney, Agent, or Firm* — Sofer & Haroun, LLP

(57) ABSTRACT

A system (10) for monitoring a network is formed by a plurality of devices (12), each device (12) of the plurality of devices having at least one status sensor (13) measuring at least one physical parameter of the device (12). The system (10) further has a monitoring platform (14) communicating with the at least one status sensor (13) by means of a telecommunications network (16).

6 Claims, 1 Drawing Sheet

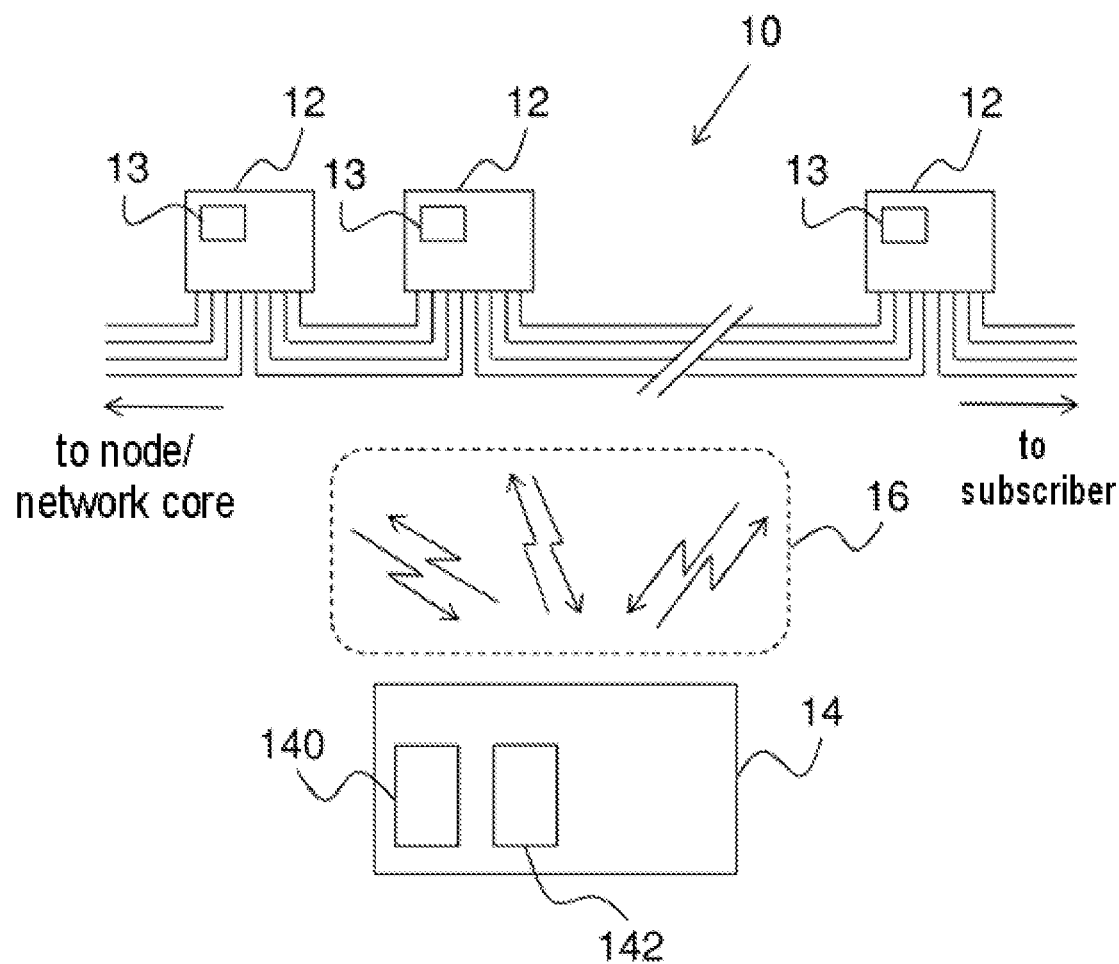

SYSTEM FOR MONITORING A NETWORK FORMED BY A PLURALITY OF DEVICES

RELATED APPLICATION

This application claims the benefit of priority from French Patent Application No. 21 10141, filed on Sep. 27, 2021, the entirety of which is incorporated by reference.

FIELD OF THE INVENTION

The present invention relates to a system for monitoring a network, with this network being formed by a plurality of devices.

The invention is in the field of automated network monitoring.

BACKGROUND

A network operator is not generally able to properly and fully monitor their network.

For example, in a fibre optic telecommunications network, fibre optic technologies with coupling prevent the location of any faults downstream of the couplers from being known.

Consequently, a national commercial operator only reacts to a failure on their network when it is reported by the client, by means of a procedure for reporting to the support service, which leads to the registration of an after-sales service ticket, called SIG (for client SIGnalling (or reporting)).

However, approximately 80% of failures are located on the link between the pooling point and the connection point and only 20% of failures are located with the client.

Network analyzers are known. However, this solution is inadequate. For example, in fibre optic networks, these network analyzers are integrated into the OLT/ONT (Optical Line Terminal/Optical Network Terminator) and do not allow all the devices included in the network to be monitored.

OBJECTS AND SUMMARY

Therefore, a requirement exists for determining the exact position of a failure on the network, for anticipating network failures, for generating automated fault trees and for shortening the periods for restoring service after a failure. This applies irrespective of the considered type of network. In other words, this requirement is not limited to fibre optic networks.

The aim of the present invention is to overcome the aforementioned shortcomings of the prior art.

To this end, the present invention proposes a system for monitoring a network formed by a plurality of devices, the system comprising the plurality of devices and being characterized in that each device of the plurality of devices comprises at least one status sensor measuring at least one physical parameter of the device and in that the system further comprises a monitoring platform communicating with the at least one status sensor by means of a telecommunications network.

Thus, the present invention allows the status of all the devices included in the network to be monitored. This also allows failures to be anticipated, preventive maintenance to be set up and a high level of reactivity to be provided in the event of a failure, by informing a technician who may already be present on site or by informing affected operators.

In a particular embodiment, the monitoring platform comprises means for recording interventions carried out by technicians on the network formed by the plurality of devices.

This allows a log to be maintained of any interventions carried out on each of the devices forming the network and thus allows predictive maintenance to be improved.

In a particular embodiment, the monitoring platform further comprises means for detecting and locating failures on the network formed by the plurality of devices.

This allows the one or more device(s) affected by the failures to be precisely located and thus allows the reaction time before a repair to be reduced.

In a particular embodiment, the network formed by the plurality of devices is a fibre optic telecommunications network and the plurality of devices comprises at least one device from among an optical connection node, a splicing point, a pooling point, an outdoor termination box, a branch point, a termination point or a network demarcation point.

In a particular embodiment, the network formed by the plurality of devices is a mobile telecommunications network.

In a particular embodiment, the network formed by the plurality of devices is a water or energy supply network.

In a particular embodiment, the network formed by the plurality of devices is a public lighting network.

In a particular embodiment, the network formed by the plurality of devices is a traffic signal network.

BRIEF DESCRIPTION OF THE DRAWINGS

Further aspects and advantages of the invention will become apparent from reading the following detailed description of particular embodiments, which are provided solely by way of non-limiting examples, with reference to the accompanying drawing, in which:

FIG. 1 is a schematic representation of a monitoring system according to the present invention, in a particular embodiment.

DETAILED DESCRIPTION

As shown in FIG. 1, the present invention relates to a network formed by a plurality of devices 12.

This network can be a fibre optic telecommunications network, or a mobile telecommunications network, or a water or energy supply network (for example, electricity or gas), or a public lighting network, or even a traffic signal network.

In a particular embodiment involving a fibre optic telecommunications network, the plurality of devices 12 can be one or more of the following device(s): an optical connection node, a splicing point, a pooling point, an outdoor termination box, a connection point, a termination point or a network demarcation point.

A system 10 for monitoring such a network comprises the plurality of devices 12.

In accordance with the present invention, each device 12 comprises one or more status sensor(s) 13 that measure one or more physical parameter(s) of the device 12.

By way of a non-limiting example, these physical parameters can be measured by contact with the device 12 or can originate from the environment of the device 12. By way of a non-limiting example, the physical parameter measured by a status sensor 13 can be the moisture content, the temperature or the occurrence of shocks, the air quality, or smoke detection.

The device 12 can further comprise means for remotely identifying the device using electronic means.

By way of a non-limiting example, this identification means can be an NFC (Near Field Communication) or RFID (Radio Frequency IDentification) tag. This tag is, for example, printed directly on the device 12, or is on a self-adhesive tag affixed, for example, on the outside of the device 12.

Optionally, the device 12, if it is in the form of a case or a cabinet, can further comprise a smart locking device, equipped with electronic circuitry allowing it to be remotely controlled via an optionally mobile telecommunications terminal. Opening and closing the device 12 can be dependent on the execution of a user authentication procedure. The open or closed status of the device 12 can be stored in a remote register. The smart locking device can communicate with the outside, for example, via NFC or RFID technology, such as the means for remotely identifying the device 12.

FIG. 1 shows that the devices 12 are connected, in a manner known per se, to a network, on the one hand, to a node belonging to the core of the network and, on the other hand, to a subscribed item of equipment, i.e., to an item of equipment of a user of the network.

In accordance with the present invention, the system 10 for monitoring the network further comprises a monitoring platform 14 that communicates with the status sensors 13 by means of a telecommunications network 16.

For example, if the device 12 comprises means for remotely identifying the casing, the monitoring platform 14 comprises reading means adapted to transmit and receive signals to and from the device 12 and from the one or more status sensor(s) 13.

In addition, the monitoring platform 14 can comprise means 140 for recording interventions carried out by technicians on the network formed by the plurality of devices 12. The recording means 140 store, for example, the date, time and the duration of the interventions, the identification data of the technician who carried out the intervention and the identification information of the relevant device 12, as well as the value of the physical parameters measured by the one or more sensor(s) 13 at the beginning and the end of the intervention.

The monitoring platform 14 can also comprise means 142 for detecting and locating a failure that occurs on the network formed by the plurality of devices 12.

The monitoring platform 14 then knows how to associate a particular status of a status sensor 13 with a failure, either by virtue of a local or remote database listing the ranges of values of the status sensor 13 during normal operation, or by communicating with the information system of the operator of the considered infrastructure.

Thus, in the case whereby the failure is associated with an ongoing intervention, the monitoring system 10 generates an information message intended for the on-site technician so that they can correct the fault. In the case whereby the failure is not associated with an ongoing intervention, the monitoring system 10 generates an information message intended for the maintenance service of the operator of the considered infrastructure, based on recordings carried out by the recording means 140 and optionally also using a mathematical analysis model that computes the best likelihoods of failure, for example, based on the frequency of any failures.

The invention claimed is:

1. A system for monitoring a network comprising:
a plurality of devices, wherein each device of said plurality of devices has at least one status sensor measuring at least one physical parameter measured by contact with said device or originating from an environment of said device, wherein said physical parameters are selected from any one of moisture content, temperature, shock occurrence, air quality, or smoke detection, and wherein said system further comprises a monitoring platform communicating with said at least one status sensor by a telecommunications network,
wherein said monitoring platform comprises a log for recording the date, time, and duration of interventions carried out by technicians on said network formed by said plurality of devices, as well as values of said physical parameters measured by said one or more sensors at the beginning and the end of the intervention,
wherein said monitoring platform further comprises a failure detection device for detecting and locating a failure status on said network formed by said plurality of devices, and associating said failure status with said at least one status sensor, and
wherein the monitoring platform is configured to associate a particular status of a status sensor with a failure, listing the ranges of values of the status sensor during normal operation.

2. The system according to claim 1, wherein said network formed by said plurality of devices is a fibre optic telecommunications network and said plurality of devices comprises at least one device from among an optical connection node, a splicing point, a pooling point, an outdoor termination box, a branch point, a termination point or a network demarcation point.

3. The system according to claim 1, wherein said network formed by said plurality of devices is a mobile telecommunications network.

4. The system according to claim 1, wherein said network of said plurality of devices is a water or energy supply network.

5. The system according to claim 1, wherein said network formed by said plurality of devices is a public lighting network.

6. The system according to claim 1, wherein said network formed by said plurality of devices is a traffic signal network.

* * * * *